(12) United States Patent
Hart et al.

(10) Patent No.: US 6,801,122 B2
(45) Date of Patent: Oct. 5, 2004

(54) IDENTIFICATION TRANSPONDER

(75) Inventors: Cornelis Maria Hart, Eindhoven (NL); Ferdinand Jacob Sluijs, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 393 days.

(21) Appl. No.: 09/935,258

(22) Filed: Aug. 22, 2001

(65) Prior Publication Data
US 2002/0047776 A1 Apr. 25, 2002

(30) Foreign Application Priority Data
Aug. 24, 2000 (EP) ............................................. 00202974

(51) Int. Cl.$^7$ .......................... H04Q 5/22; G08B 13/14
(52) U.S. Cl. ................ 340/10.4; 340/572.1; 340/572.5; 340/572.7
(58) Field of Search ............................ 340/10.4, 725.31

(56) References Cited

U.S. PATENT DOCUMENTS

| | | | | |
|---|---|---|---|---|
| 5,682,143 A | * | 10/1997 | Brady et al. | ............. 340/572.7 |
| 5,731,691 A | * | 3/1998 | Noto | ............................ 323/220 |
| 5,973,598 A | * | 10/1999 | Beigel | ........................ 340/572.1 |
| 6,037,255 A | * | 3/2000 | Hussein et al. | .............. 438/675 |
| 6,060,664 A | * | 5/2000 | Tanahashi et al. | ........ 174/125.1 |
| 6,133,835 A | * | 10/2000 | De Leeuw et al. | ....... 340/572.5 |
| 6,181,287 B1 | * | 1/2001 | Beigel | ........................... 343/741 |
| 6,206,292 B1 | * | 3/2001 | Robertz et al. | .............. 235/488 |
| 6,268,796 B1 | * | 7/2001 | Gnadinger et al. | ....... 340/572.5 |

FOREIGN PATENT DOCUMENTS

| | | | | |
|---|---|---|---|---|
| EP | 1026832 A1 | 8/2000 | ............. H04B/1/59 |
| WO | WO9954842 | 10/1999 | ........... G06K/19/02 |

* cited by examiner

*Primary Examiner*—Michael Horabik
*Assistant Examiner*—Kimberly Hamilton
(74) *Attorney, Agent, or Firm*—Kevin Simons

(57) ABSTRACT

An identification transponder for transferring an identification code to a base station by varying an RF-signal transmitted by the base station in a rhythm which corresponds to the identification code. The identification transponder comprises an identification code generator, a rectifier; and a load transistor. The load transistor is arranged in such a manner that it performs two tasks: the task of rectifying the RF-signal to provide the DC supply voltage for the transponder, and the task of supplying a variable load to the rectifier to thereby vary the RF-signal transmitted by the base station.

20 Claims, 8 Drawing Sheets

FIG. 1 [PRIOR ART]

IDENTIFICATION TRANSPONDER

The invention relates to an identification transponder for providing an identification code to a base station through variation of a radio frequency signal originating from the base station in a rhythm corresponding to the identification code, comprising identification generation means for generating the identification code; rectifying means constructed so as to achieve a coupling without direct electrical contact with the radio frequency signal for providing a supply voltage to the identification generation means, which rectifying means comprise at least one circuit acting as a rectifier; and a load transistor with a main current path and with a control electrode which is coupled to a signal output terminal of the identification generation means for providing a varying load to the rectifying means as a result of which the radio frequency signal varies in said rhythm.

Figure 1:
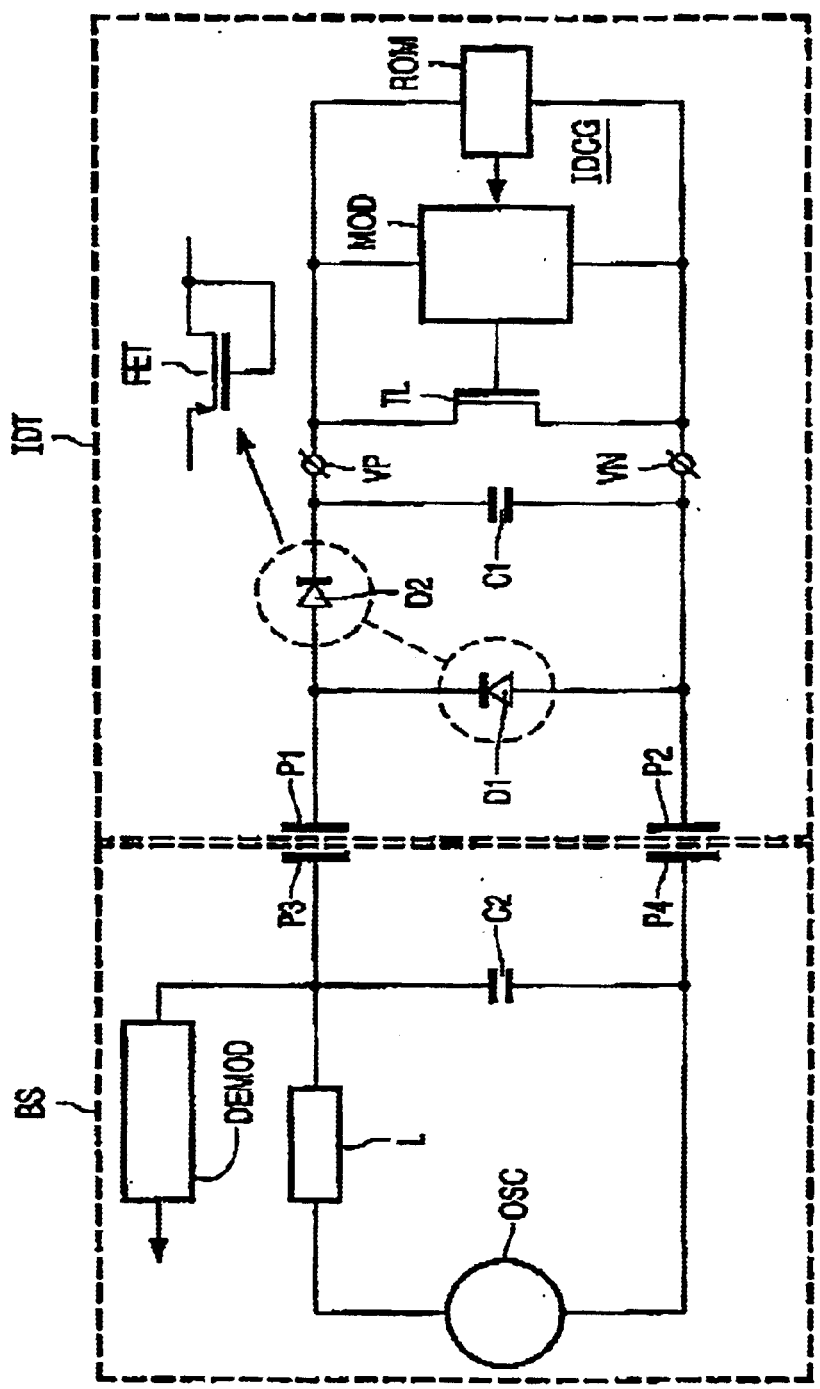

Such an identification transponder is known from U.S. Pat. No. 6,133,835, issued Oct. 17, 2000 to Dagobert M. De Leeuw, Cornelis M. Hart, and Marco Matters, and incorporated by reference herein. The known identification transponder is shown in FIG. 1 together wit a base station or scanner. The base station BS transmits an RF signal that is generated by an oscillator OSC, inductor L, and capacitor C2. The RF signal is supplied to a rectifier in the transponder by means of a coupling (P1;P3, P2;P4), a capacitive coupling in this case, which rectifier is built up with diodes D1 and D2 and a smoothing capacitor C1. As a result, a supply voltage is available between the output terminals VP and MN of the rectifier. The known identification transponder IDT further comprises an identification code generator IDOG which comprises a so-called read-only memory ROM and a modulator MOD, which are both supplied from the supply voltage between the terminals VP and VN. The known identification transponder IDT further comprises a load transistor TL which is coupled with a main current path between the terminals VP and VN. During operation, the modulator MOD sends a serial bit pattern to a control electrode of the load transistor TL. The serial bit pattern is determined by the data stored in the memory ROM. As a result, the load between the terminals VP and VN is varied in the rhythm of the serial bit pattern. This causes the input current of tbe rectifier to be varied in said rhythm. This rhythm can be detected by the base station BS by means of the coupling (P1;P3, P2;P4), and decoded via a demodulator DEMOD. The ROM may be, for example, a bar code on an object which contains information about the object, for example the price of the object. This information is transmitted to the base station BS via a temporary coupling to the base station BS. The transponder IDT may be costructed, for example, as part of an integrated circuit manufactured from organic materials, for example polymers. This has the advantage that an identification transponder can be realized thereby with a small thickness and a high mechanical flexibility.

Generally, but in particular in the realization of electronic circuits with organic materials, it is advantageous to minimize the number of electronic components required. The present invention meets this requirement in that the identification transponder mentioned in the opening paragraph is characterized in that one of the circuits acting as said rectifier comprises the main current path of the load transistor.

Since the load transistor performs a dual function, i.e. the function of providing a variable load and the function of a rectifying element, one electronic component less is necessary. Indeed, the rectifier requires one diode less, and no additional components are added elsewhere in the electronic circuit.

Further advantageous embodiments of the invention are specified in the claims 2 to 6.

Figure 2:
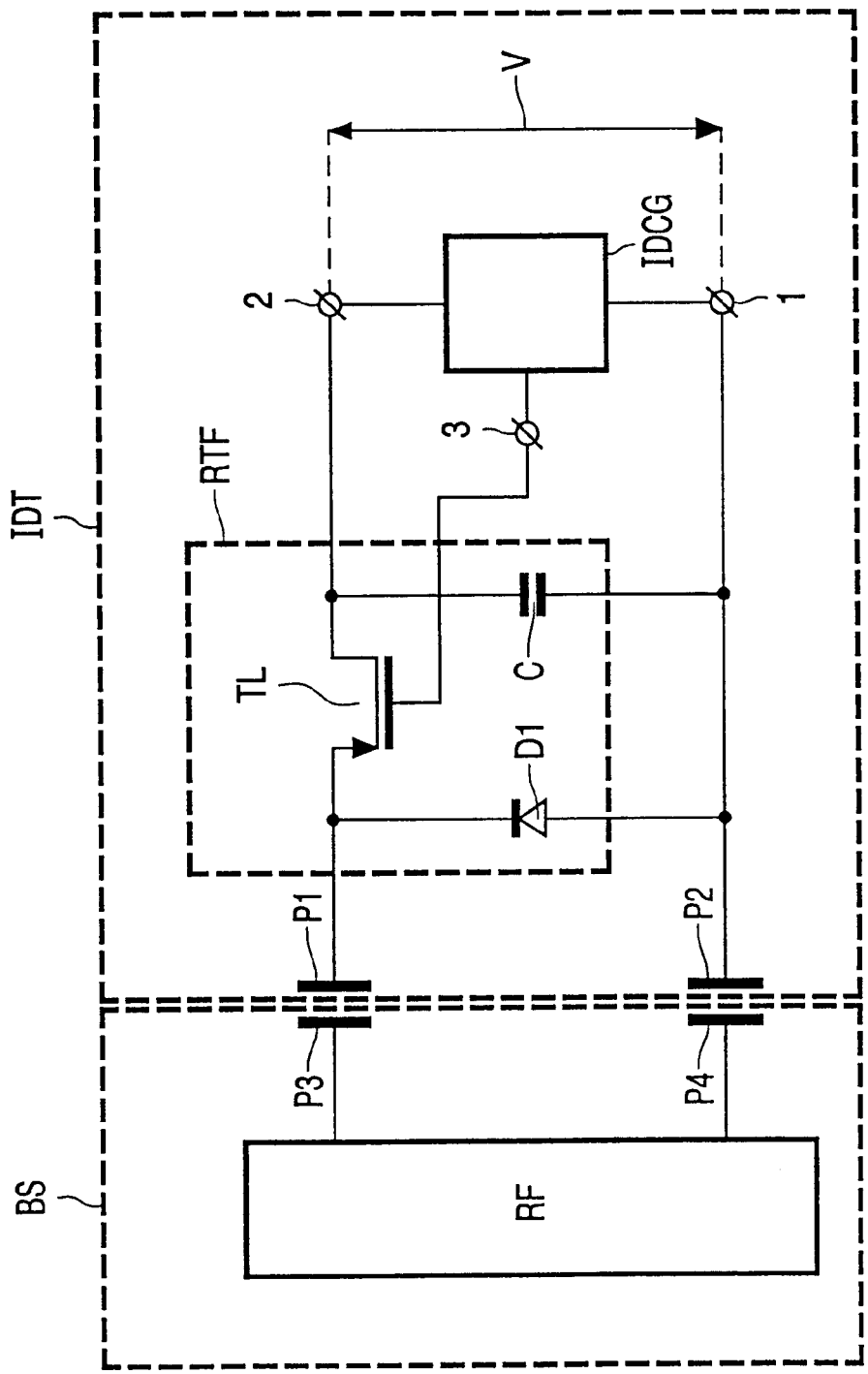
Figure 3:
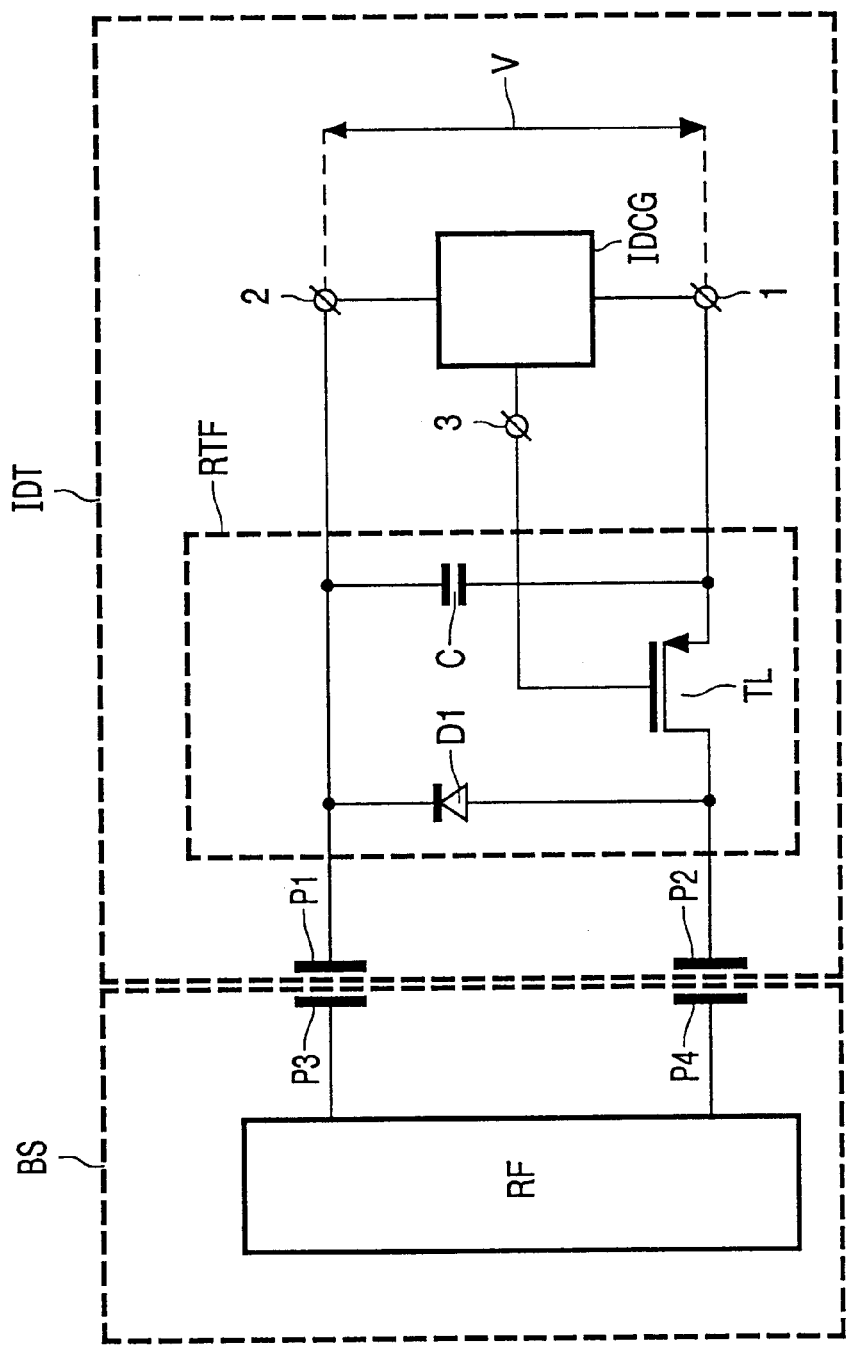
Figure 4:
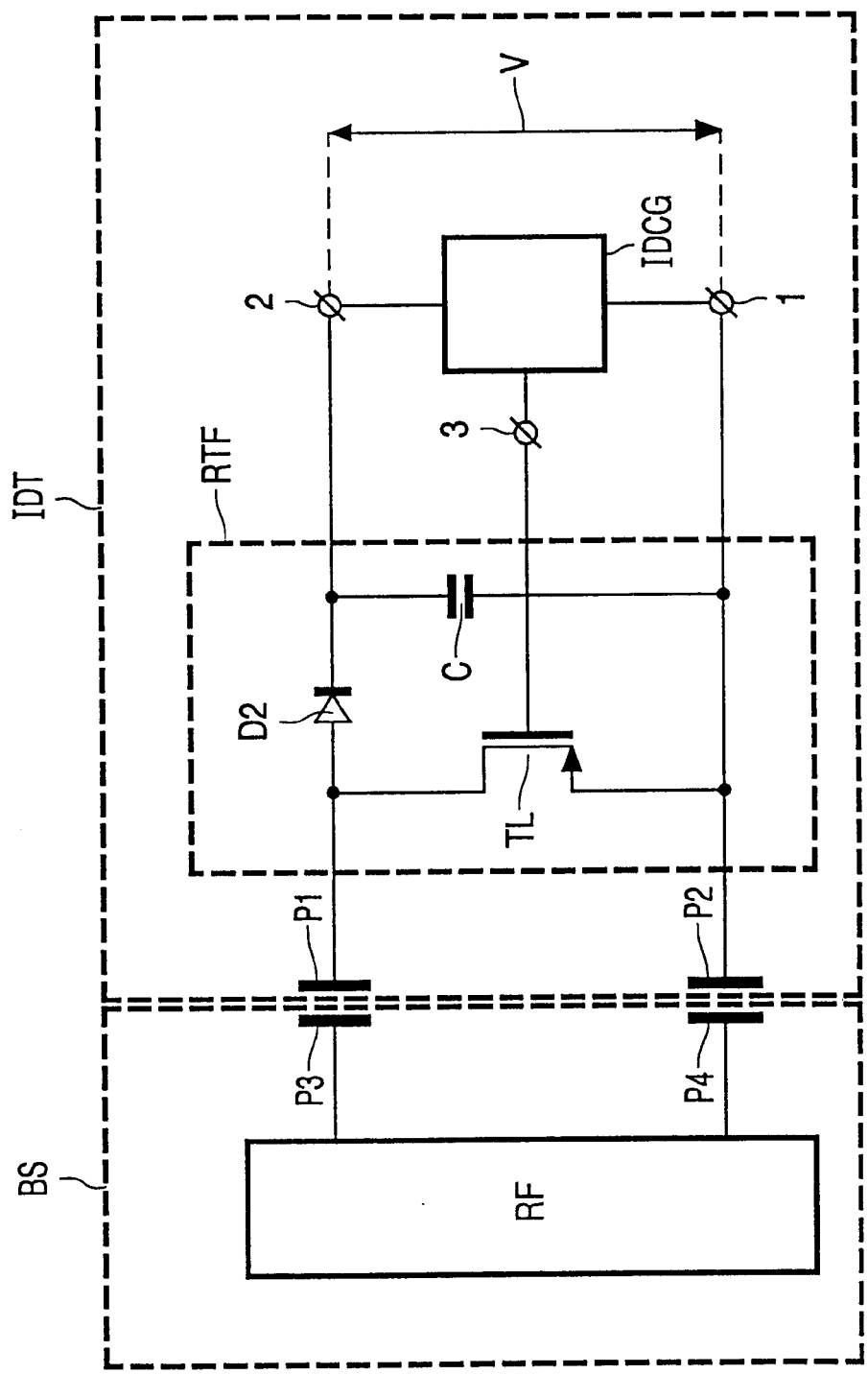
Figure 5:
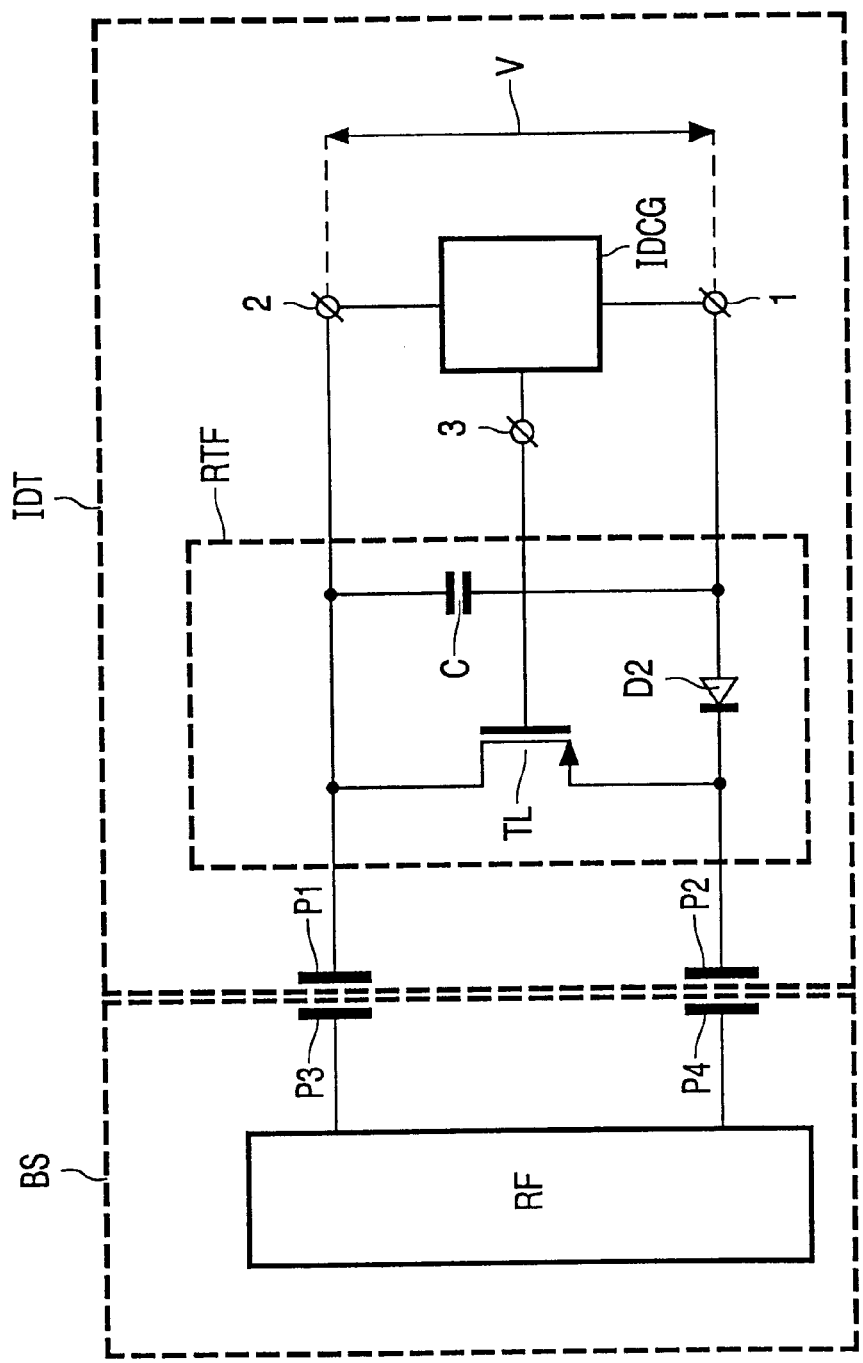
Figure 6:
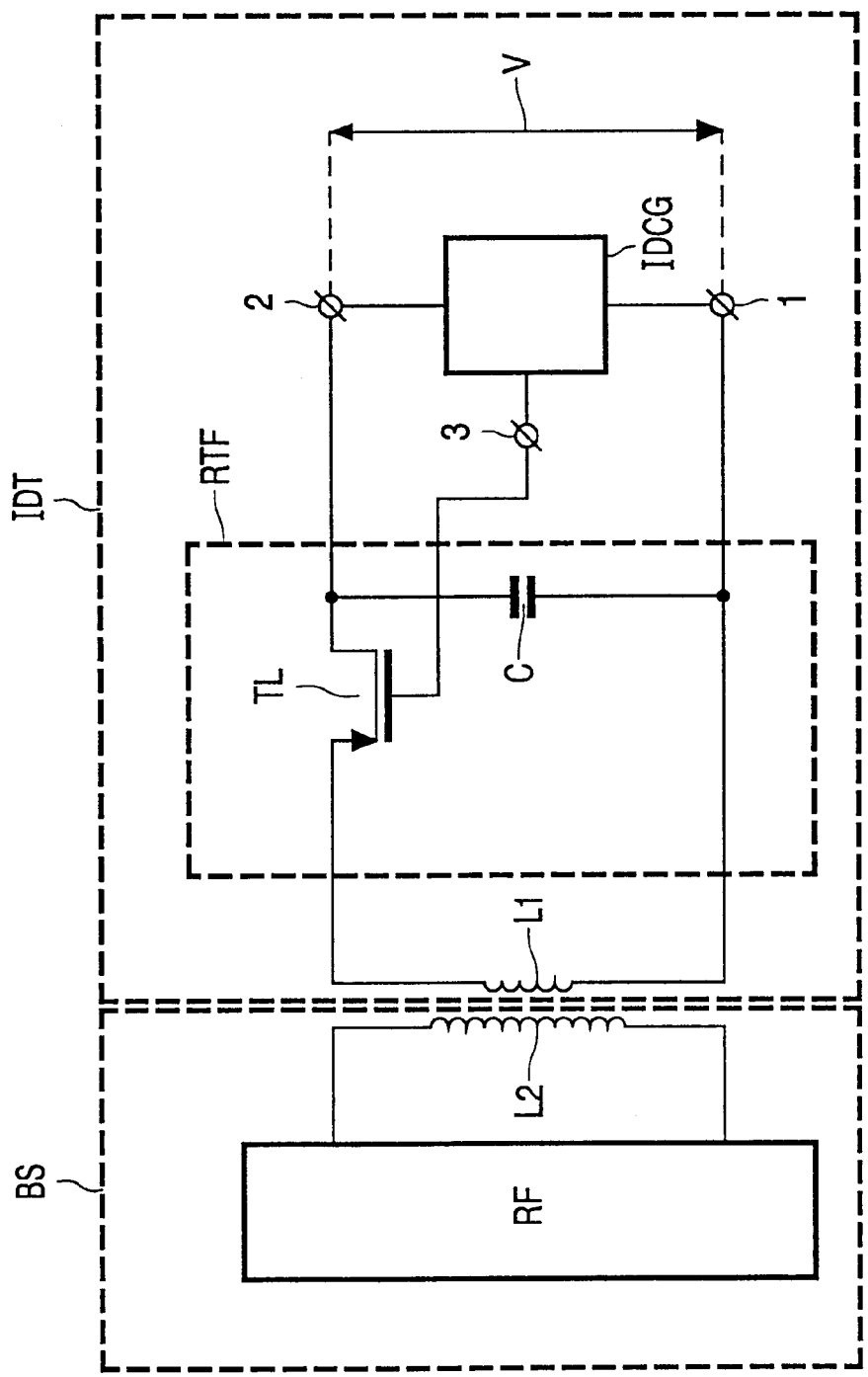
Figure 7:
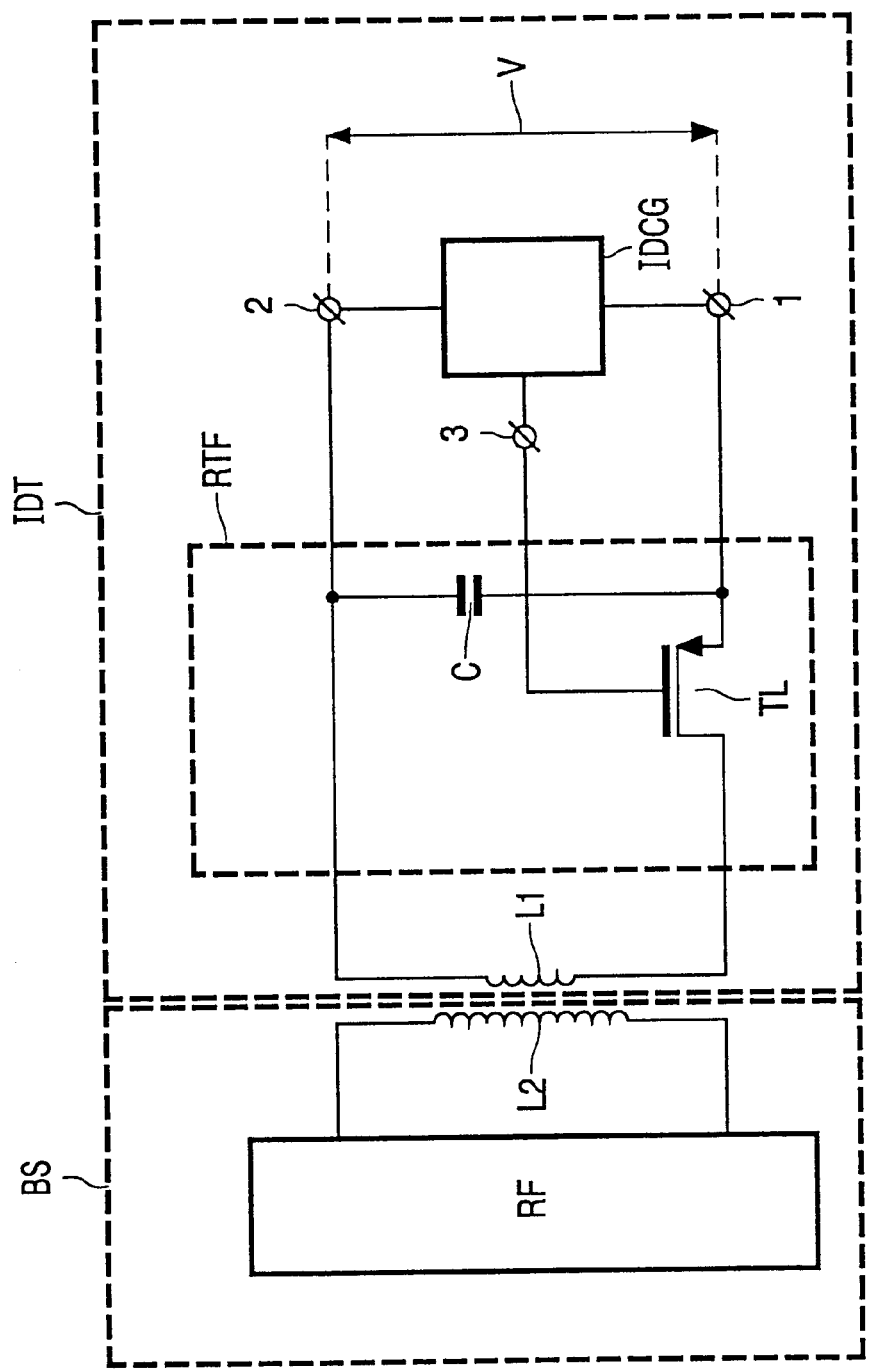
Figure 8:
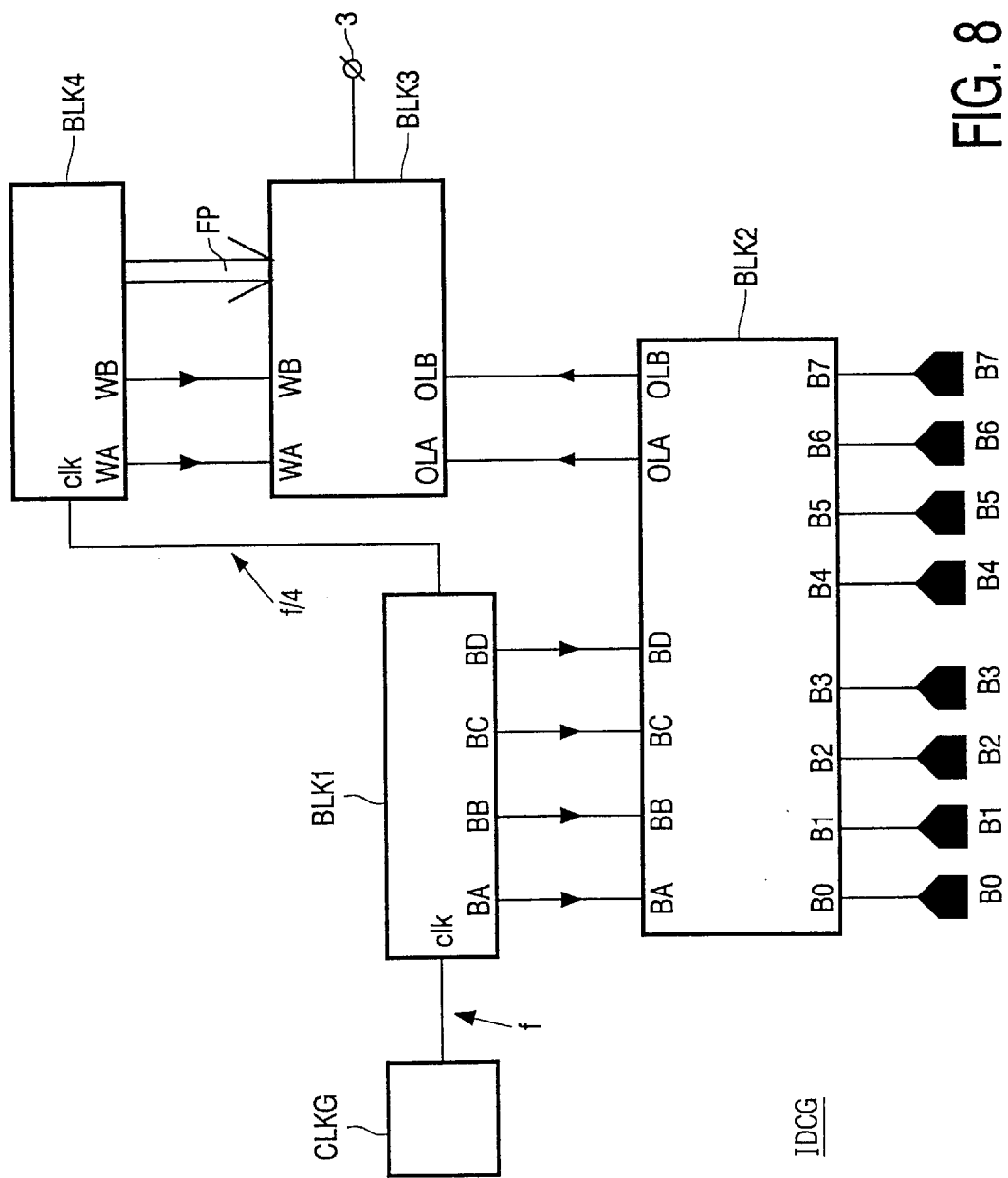

The invention will be explained in more detail below with reference to the accompanying drawing, in which:

FIG. 1 shows a known identification transponder,

FIG. 2 is a circuit diagram of a first embodiment of an identification transponder according to the invention, FIG. 3 is a circuit diagram of a second embodiment of an identification transponder according to the invention, FIG. 4 is a circuit diagram of a third embodiment of an identification transponder according to the invention, FIG. 5 is a circuit diagram of a fourth embodiment of an identification transponder according to the invention, FIG. 6 is a circuit diagram of a fifth embodiment of an identification transponder according to the invention, FIG. 7 is a circuit diagram of a sixth embodiment of an identification transponder according to the invention, and FIG. 8 shows an example of a circuit diagram of the identification generation means which may be used in an identification transponder.

Identical components or elements have been given the same reference symbols in these Figures.

FIG. 2 is a circuit diagram of a first embodiment of an identification transponder IDT according to the invention. FIG. 2 also diagrammatically shows a base station BS for transmitting an RF signal. The identification transponder IDT comprises an electrically conducting plane P1 for coupling to an electrically conducting plane P3 of the base station BS, and electrically conducting plane P2 for coupling to an electrically conducting plane P4 of the base station BS. The identification transponder IDT further comprises rectifying means RTF and identification generation means IDCG. The rectifying means RTF comprise a diode D1, a load field effect transistor TL, and a smoothing capacitor C. The diode D1 is connected by a cathode and an anode to the electrically conducting plane P1 and the electrically conducting plane P2, respectively. A first supply connection terminal 1 of the identification generation means IDCG is connected to the second electrically conducting plane P2. A source of the load transistor TL is connected to the electrically conducting plane P1. A drain of the load transistor TL is connected to a second supply terminal 2 of the identification generation means IDCG. A gate of the load transistor TL is connected to a signal output terminal 3 of the identification generation means IDCG. A smoothing capacitor C is connected between the first supply terminal 1 and the second supply terminal 2. The supply voltage between the first supply terminal 1 and the second supply terminal 2 is denoted V.

The electronic system of FIG. 2 operates as follows. The electrically conducting contact planes P1 to P4 form a capacitive coupling between the base station's RF transmitter and the identification transponder IDT. A portion of the RF signal is supplied to the rectifying means RTF as a result of this. The load transistor TL is or is not in the conductive state, depending on the signal level at the signal output terminal 3. If the load transistor TL is conducting, it takes over the function of the diode D2 as in the known identification transponder of FIG. 1. The function of the diode D1 is to ensure that the average current flowing to or from the electrically conducting planes P1 to P4 is equal to zero on avenge, it is prevented thereby that a DC voltage can accumulate between the respective conducting surfaces P1 and P3, and P2 and P4. This would in fact hamper the operation of the identification transponder IDCT. The rectified RF signal is smoothed by the smoothing capacitor C. A substantially constant supply voltage V arises as a result of this between the first and the second supply terminal 1 and 2 of the identification generation means IDCG. The load of the rectifying means RTF (i.e. between the first supply terminal 1 and the second supply terminal 2) is determined not only by the identification generation means IDCG but also by the load transistor TL. The identification generation means IDCG are designed for supplying a varying signal to the signal output terminal 3. This signal varies in a rhythm which corresponds to an identification code. The identification code represents, for example, the price of an object to be scanned, Since the varying signal is supplied to the gate of the load transistor TL, the conduction of the load transistor TL will also vary in the rhythm corresponding to the identification code. The quantity of the RF signal derived from the base station BS will thus also be varied in said rhythm. This variation in the RF signal may be detected in a known manner, for example in the manner indicated in FIG. 1. The circuit diagram of FIG. 3 may alternatively be used as an equivalent of the circuit diagram of FIG. 2; now the main current path of the load transistor TL is not arranged between the electrically conducting plane P1 and the supply terminal 2 but between the electrically conducting plane P2 and the supply terminal 1. FIG. 4 is a circuit diagram of an embodiment of the invention in which the function of the diode D2 (see FIG. 1) is not taken over by the load transistor TL, as in FIGS. 2 and 3, but where the function of the diode D1 (sec FIG. 1) is taken over by the load transistor TL. FIG. 5 is a circuit diagram forming an equivalent alternative for the circuit diagram of FIG. 4. The diode D2 is connected here between the conducting plane P2 and the supply terminal 1 instead of between the conducting plane P1 and the supply terminal 2. FIGS. 6 and 7 show circuit diagrams of embodiments of the invention which correspond to the embodiments of FIGS. 2 and 3, respectively, but here the coupling between the base station BS and the identification transponder IDT is not capacitively achieved but inductively. For this purpose, a coil L1 of the identification transponder IDT is coupled to a coil L2 of the base station BS. Owing to the inductive coupling, the diode D1 shown in FIGS. 2 and 3 is unnecessary in the circuits of FIGS. 6 and 7.

It is true for the imbodiments shown that an N-type field effect transistor may be used instead of a P-type field effect transistor as the load transistor TL. It is even possible to use bipolar transistors. Depending on the choice made, the cathode and anode connections of the decode D1 or D2 are to be exchanged, and the polarity of the varying signal at the signal output terminal 3 is to be adapted. The diodes D1 or D2 may be constructed, for example, with a transistor connected as a diode.

FIG. 8 shows an example of a circuit diagram of the identification code generator IDCG. An identification code may be composed, for example, of two words of four bits each, for example as indicated for a block BLK2, which is capable of receiving two words of four bits, i.e. the first word consisting of bits B0 to B3, and the second word consisting of bits B4 to B7. The block BLK1, which is controlled with a clock frequency f at the clock input clk from the clock generator CLKG, generates signals BA, BB, BC and BD and sends them to block BLK2. The bits B0 and B4 are transmitted to the outputs OLA and OLB, respectively, under the control of the binary signal BA. The bits B1 and B5 are transmitted to the outputs OLA and OLB, respectively, under the control of the binary signal BB. The bits B2 and B6 are transmitted to the outputs OLA and OLB, respectively, under the control of the binary signal BC. The bits B3 and B7 are transmitted to the outputs OLA and OLB, respectively, under the control of the binary signal BD. The binary signals BA, BB, BC, and BD are passed on sequentially to the block BLK2. As a result, the first word is serially transmitted from the output OLA of the block BLK2 to the input OLA of the block BLK3. Simultaneously, the second word is transmitted from the output OLB of the block BLK2 to the input OLB of the block BLK3. An output of the block BLK1 is coupled to the clock input clk of the block BLK4 for providing a clock frequency which is one quarter the clock frequency of the block BLK1. Word selection signals WA and WB are sent from the block BLK4 to the block BLK3 so as to indicate which word, i.e. either the first or the second word, is to be passed on from the block BLK2 to the signal output terminal 3. Sequential activation of the word signals WA and WB achieves that first the first word is passed on to the signal output terminal 3, and then the second word is passed on to the signal output terminal 3, so that the bits B0 to B7 appear sequentially at the signal output terminal 3. Furthermore, words having a fixed pattern FP are sequentially transmitted to the signal output terminal 3. These words having the fixed pattern FP serve to indicate to the base station BS when the first bit B0 starts and when the last bit B7 ends. The fixed pattern may be, for example, a series of four logic zeros followed by a series of four logic ones. However, alternative patterns may also be chosen as long as the base station BS recognizes this pattern in some way.

What is claimed is:

1. An identification transponder for providing an identification code to a base station through variation of a radio frequency signal originating from the base station in a rhythm corresponding to the identification code, comprising an identification generator that is configured to generate the identification code;

a rectifier that is constructed so as to achieve a coupling without direct electrical contact with the radio frequency signal for providing a supply voltage to the identification generator, and a load transistor with a main current path and with a control electrode which is coupled to a signal output terminal of the identification generator for providing a varying load to the rectifier as a result of which the radio frequency signal varies in said rhythm, wherein the rectifier comprises the main current path of the load transistor.

2. A transponder as claimed in claim 1, further comprising:

a first contact plane for capacitive coupling to a first contact plane of the base station, and a second contact plane for capacitive coupling to a second contact plane of the base station, wherein:

the rectifier further comprises a rectifying circuit that is coupled between the first contact plane of the transponder and the second contact plane of the transponder, and the main current path of the load transistor is coupled in series with a supply terminal of the identification generator.

3. A transponder as claimed in claim 1, further comprising:

a first contact plane for capacitive coupling to a first contact plane of the base station, and a second contact plane for capacitive coupling to a second contact plane of the base station, wherein:

the main current path of the load transistor is connected between the first contact plane of the transponder and the second contact plane of the transponder, and in that the rectifier comprises a rectifying circuit that is connected in series with a supply terminal of the identification generator.

4. A transponder as claimed in claim 1, wherein the coupling without direct electrical contact is an inductive coupling owing to the fact that the transponder comprises a coil for inductive coupling to a coil of the base station, said coil being electrically coupled to the rectifier for receiving the radio frequency signal, and in that the main current path of the load transistor is coupled in series with a supply terminal of the identification generator.

5. A transponder as claimed in claim 1, wherein the rectifier and the load transistor are constructed with electronic components manufactured substantially from one or several organic materials.

6. A transponder as claimed in claim 5, wherein at least one of the organic materials is a polymer.

7. A transponder comprising:

a rectifier circuit that is configured to rectify an RF signal from a base station to provide a supply voltage to the transponder, a load transistor that is configured to modulate current provided by the rectifier circuit, and a modulator that is configured to control the load transistor to modulate the current; wherein the load transistor is included within the rectifier circuit and is also configured to rectify the RF signal.

8. The transponder of claim 7, further including a pair of conductive plates that facilitate a capacitive coupling to the base station for receiving the RF signal at the transponder.

9. The transponder of claim 8, wherein the load transistor is configured in series between one of the conductive plates and a supply terminal of the modulator.

10. The transponder of claim 8, wherein the load transistor is configured in parallel with the pair of conductive plates.

11. The transponder of claim 8, wherein the rectifier comprises organic material.

12. The transponder of claim 8, wherein the rectifier comprises an organic polymer.

13. The transponder of claim 8, wherein the modulator is configured to modulate the current to correspond to an identification code associated with the transponder.

14. The transponder of claim 7, further including a coil that facilitates an inductive coupling to the base station for receiving the RF signal at the transponder.

15. The transponder of claim 14, wherein the load transistor is configured in series between the coil and a supply terminal of the modulator.

16. The transponder of claim 14, wherein the load transistor is configured in parallel with the coil.

17. The transponder of claim 14, wherein the rectifier comprises organic material.

18. The transponder of claim 14, wherein the rectifier comprises an organic polymer.

19. The transponder of claim 14, wherein the modulator is configured to modulate the current to correspond to an identification code associated with the transponder.

20. The transponder of claim 7, wherein the modulator is configured to modulate the current to correspond to an identification code associated with the transponder.

\* \* \* \* \*